United States Patent
Hsiao

(10) Patent No.: US 8,341,378 B2
(45) Date of Patent: Dec. 25, 2012

(54) DATA STORAGE DEVICE AND DATA ACCESS METHOD

(75) Inventor: Wei-Yi Hsiao, Kaohsiung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 322 days.

(21) Appl. No.: 12/855,575

(22) Filed: Aug. 12, 2010

(65) Prior Publication Data

US 2011/0179216 A1 Jul. 21, 2011

(30) Foreign Application Priority Data

Jan. 20, 2010 (TW) .............................. 99101461 A

(51) Int. Cl.
*G06F 12/02* (2006.01)
(52) U.S. Cl. ............ 711/202; 700/824; 710/3; 711/103; 711/165; 711/173
(58) Field of Classification Search .................. 711/103, 711/165, 173, 202; 707/824; 710/3
See application file for complete search history.

(56) References Cited

U.S. PATENT DOCUMENTS

| 7,917,479 B2* | 3/2011 | Sepulveda | 707/690 |
| 2002/0124130 A1* | 9/2002 | Iida et al. | 711/103 |
| 2005/0055532 A1* | 3/2005 | Yu | 711/203 |
| 2010/0125695 A1* | 5/2010 | Wu et al. | 711/103 |

* cited by examiner

*Primary Examiner* — Jae Yu
(74) *Attorney, Agent, or Firm* — McClure, Qualey & Rodack, LLP

(57) ABSTRACT

The invention provides a data access method for a flash memory. First, a write command, a write address, and target data are received from a host. A target block corresponding to the write address is then determined. Whether a storage space with the write address in the target block stores data is then determined. When the storage space does not store data, the target data is written to the storage space of the target block. When the storage space stores data, whether a file allocation table (FAT) block mapped to the target block exists in the flash memory is then determined. When the FAT block exists, the target data is written to the FAT block. When the FAT block does not exist, whether a child block mapped to the target block exists in the flash memory is determined. When the child block exists, the target data is written to the child block.

16 Claims, 7 Drawing Sheets

| Receiving order | Command | Address range | Update data |
|---|---|---|---|
| 1 | Write command 1 | 101~200 | Data H |
| 2 | Write command 2 | 201~300 | Data I |
| 3 | Write command 3 | 251~400 | Data J$_1$ (251~300), Data J$_2$ (201~400) |
| 4 | Write command 4 | 451~500 | Data K |
| 5 | Write command 5 | 401~500 | Data M |

FIG. 4A

| Update address table | |
|---|---|
| Original address in a mother block | Update address in an FAT block |
| 0 | |
| 1 | |
| 2 | |
| ... | ... |
| 998 | 353 |
| 999 | 354 |
| 1000 | |

FIG. 5

DATA STORAGE DEVICE AND DATA ACCESS METHOD

CROSS REFERENCE TO RELATED APPLICATIONS

This application claims priority of Taiwan Patent Application No. 99101461, filed on Jan. 20, 2010, the entirety of which is incorporated by reference herein.

BACKGROUND OF THE INVENTION

1. Field of the Invention

The invention relates to memories, and more particularly to data access methods of flash memories.

2. Description of the Related Art

A flash memory comprises a plurality of blocks, and each block comprises a plurality of pages for data storage. When the flash memory receives a write command from a controller, the flash memory writes data to pages of the blocks thereof according to the received write command. When the flash memory receives a read command from the controller, the flash memory reads data from pages of the blocks thereof according to the received read command, and then sends read-out data back to the controller.

After data is written to a spare page of a block of the flash memory, the spare page becomes a data page and data cannot be written to the data page again. The data page can only be programmed with data again after data is erased from all pages of a block containing the data page to return the pages of the block to spare pages. Because a block comprises thousands of pages, erasing data from all pages of a block requires a long time period and causes a long delay. Thus, the controller cannot erase data from a block with a high frequency. Otherwise, the performance of the controller and the flash memory is degraded.

When a host sends a write command to a controller to request the controller to write new data to a write address, and an old page corresponding to the write address has stored old data therein, the controller cannot write the new data received from the host to the old page of a flash memory. The controller, however, still must execute the write command. Ordinarily, the controller selects a spare block from a plurality of blocks of the flash memory, and writes the new data to a spare page of the spare block instead of the old page. There is therefore a mapping relationship between the spare block containing the spare page storing the new data and a target block containing the old page storing the old data. The target block containing the old page storing the old data is referred to as a mother block. The spare block containing the spare page storing the new data is referred to as a child block.

Referring to FIG. 1, a schematic diagram of a child block 104 mapped to a mother block 102 in a flash memory is shown. An address range of a plurality of pages of the mother block 102 is from 0~1000. The mother block 102 stores old data A0, B0, C0, and D0 which respectively corresponds to address ranges 0~400, 400~600, 600~700, and 700~1000. When the host requests the controller to writes update data B1 to an address range 400~600 of the flash memory, because the address range 400~600 of the mother block 102 has stored the old data B0, the controller cannot write the update B1 to the mother block 102 again. The controller then selects a spare block from the flash memory as a child block 104 mapped to the mother block 102. The controller then copies the old data A0, stores the copied old data A0 to an address range 0~400 of the child block 104, and then writes the update data B1 received from the host to an address range 400~600 of the child block 104. Similarly, when the host requests the controller to write update data C1 to an address range 600~700 of the flash memory, because the address range 600~700 of the mother block 102 has stored the old data C0, the controller directly writes the update data C1 received from the host to an address range 600~700 of the child block 104.

When the host requests the controller to write new update data to an address range 0~700 of the flash memory, because the address ranges 0~700 of both the mother block 102 and the child block 104 have respectively stored the old data A0~C0 and A0~C1, the controller cannot write the new update data received from the host to any of the address ranges 0~700 of the mother block 102 and the child block 104. Thus, a data access method of a flash memory is required to solve the aforementioned problem.

BRIEF SUMMARY OF THE INVENTION

The invention provides a data access method for a flash memory. First, a write command, a write address, and target data are received from a host. A target block corresponding to the write address is then determined, wherein the target block is one of a plurality of blocks of the flash memory. Whether a storage space with the write address in the target block stores data is then determined. When the storage space of the target block does not store data, the target data is written to the storage space of the target block. When the storage space of the target block stores data, whether a file allocation table (FAT) block mapped to the target block exists in the flash memory is then determined. When the FAT block exists, the target data is written to the FAT block. When the FAT block does not exist, whether a child block mapped to the target block exists in the flash memory is determined. When the child block exists, whether the write address follows a last address according to which data has been stored in the child block is determined. When the write address follows the last address, the target data is written to the child block.

The invention provides a data storage device. In one embodiment, the data storage device comprises a flash memory and a controller. The flash memory comprises a plurality of blocks for data storage. The controller receives a write command, a write address, and target data from a host, determines a target block corresponding to the write address, determines whether a storage space with the write address in the target block stores data, writes the target data to the storage space of the target block when the storage space of the target block does not store data, determines whether a file allocation table (FAT) block mapped to the target block exists in the flash memory when the storage space of the target block stores data, writes the target data to the FAT block when the FAT block exists, determines whether a child block mapped to the target block exists in the flash memory when the FAT block does not exist, determines whether the write address follows a last address according to which data has been stored in the child block when the child block exists, and writes the target data to the child block when the write address follows the last address.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4A shows an embodiment of a series of write commands sent by a host to a controller;

FIG. 5 shows an embodiment of an update address table stored in an FAT block according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
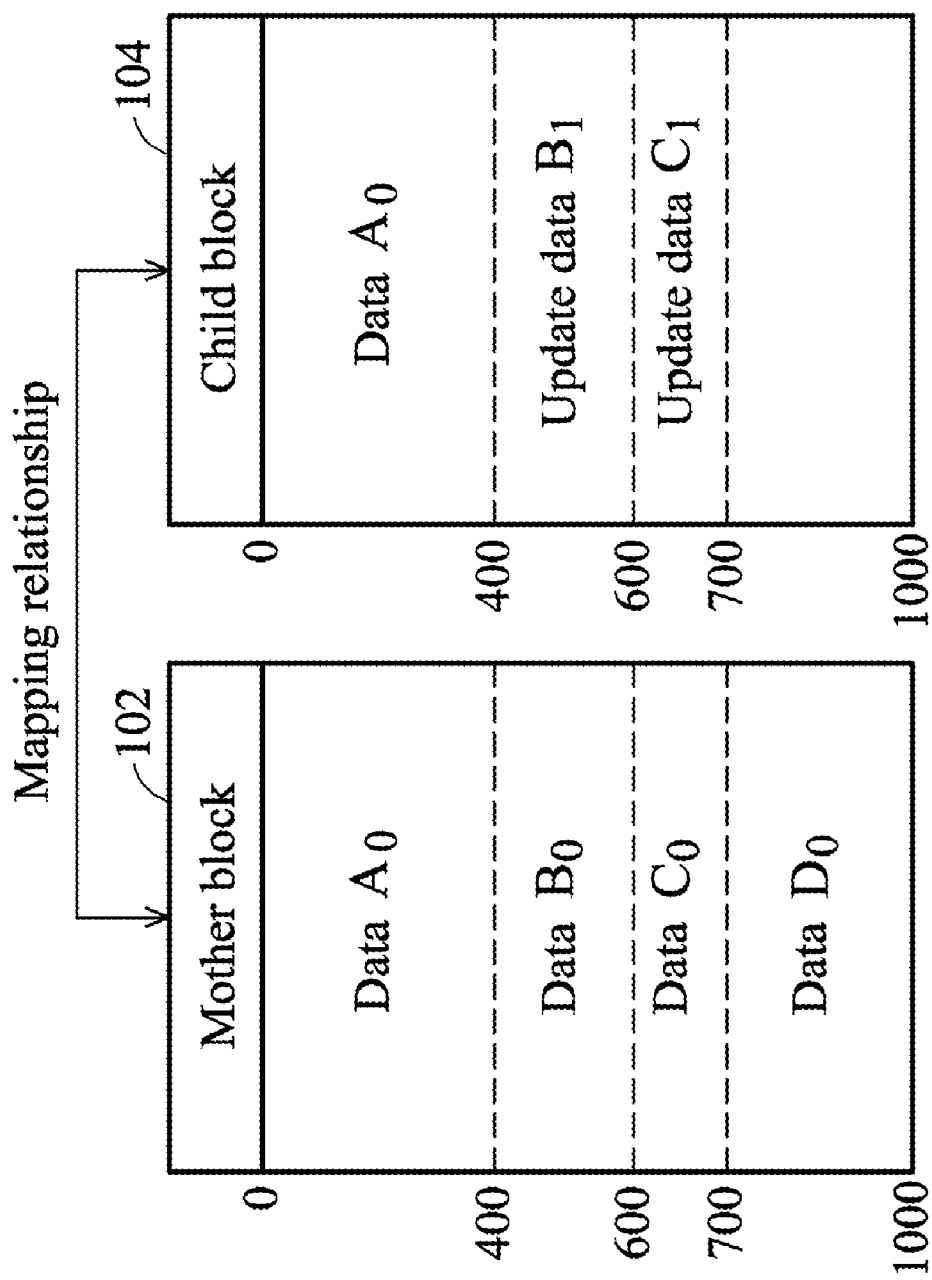
FIG. 1 is a schematic diagram of a child block mapped to a mother block in a flash memory.
Figure 2:
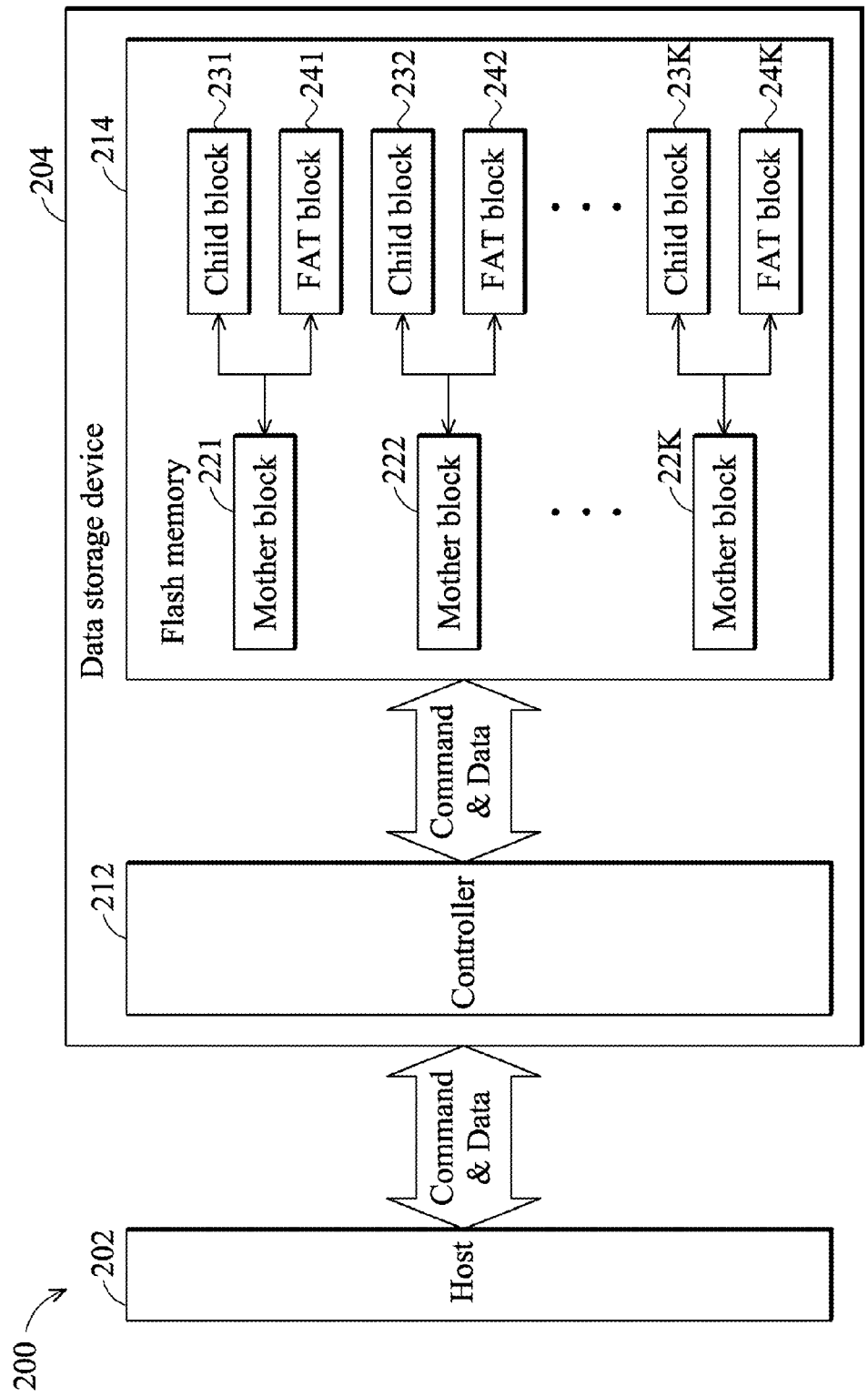
FIG. 2 is a block diagram of a data storage system according to the invention.

Referring to FIG. 2, a block diagram of a data storage system 200 according to the invention is shown. The data storage system 200 comprises a host 202 and a data storage device 104. The data storage device 204 comprises a controller 212 and a flash memory 214. The flash memory 214 comprises a plurality of blocks, and each block comprises a plurality of pages for data storage. When the host 202 sends a write command to the data storage device 204, the controller 212 writes data to the flash memory 214 according to the write command. When the host 202 sends a read command to the data storage device 204, the controller 212 reads data from the flash memory 214 according to the read command.

When an address range of a specific block of the flash memory 214 has stored old data, and the host 202 requests the controller 212 to write update data to the address range again, the controller 212 cannot directly write the update data to the specific block. According to a conventional method, the controller 212 selects a spare block from the flash memory 214 as a child block mapped to the specific block, and then writes the update data to the child block. When the host 202 requests the controller 212 to write new update data to the address range for a third time, the controller 212, however, cannot directly write the update data to the specific block or the child block.

According to the invention, the controller 212 selects another spare block from the flash memory 214 as a file allocation table (FAT) block mapped to the specific block, and then writes the new update data to the FAT block. As shown in FIG. 2, a child block 231 and an FAT block 241 are mapped to a mother block 221, and the mother block 221, the child block 231, and the FAT block 241 corresponds to the same address range. Similarly, a child block 23K and an FAT block 24K are mapped to a mother block 22K, and the mother block 22K, the child block 23K, and the FAT block 24K corresponds to the same address range. An FAT block stores update data in a different manner in comparison with a child block. A child block can only store update data with a starting address following a last address according to which data has been stored in the child block. Because an FAT block records addresses of update data with an update address table, the FAT block, however, can store update data with any starting address in the address range of a mother block. The FAT block therefore stores update data in a more efficient way in comparison with the child block.

Figure 3:
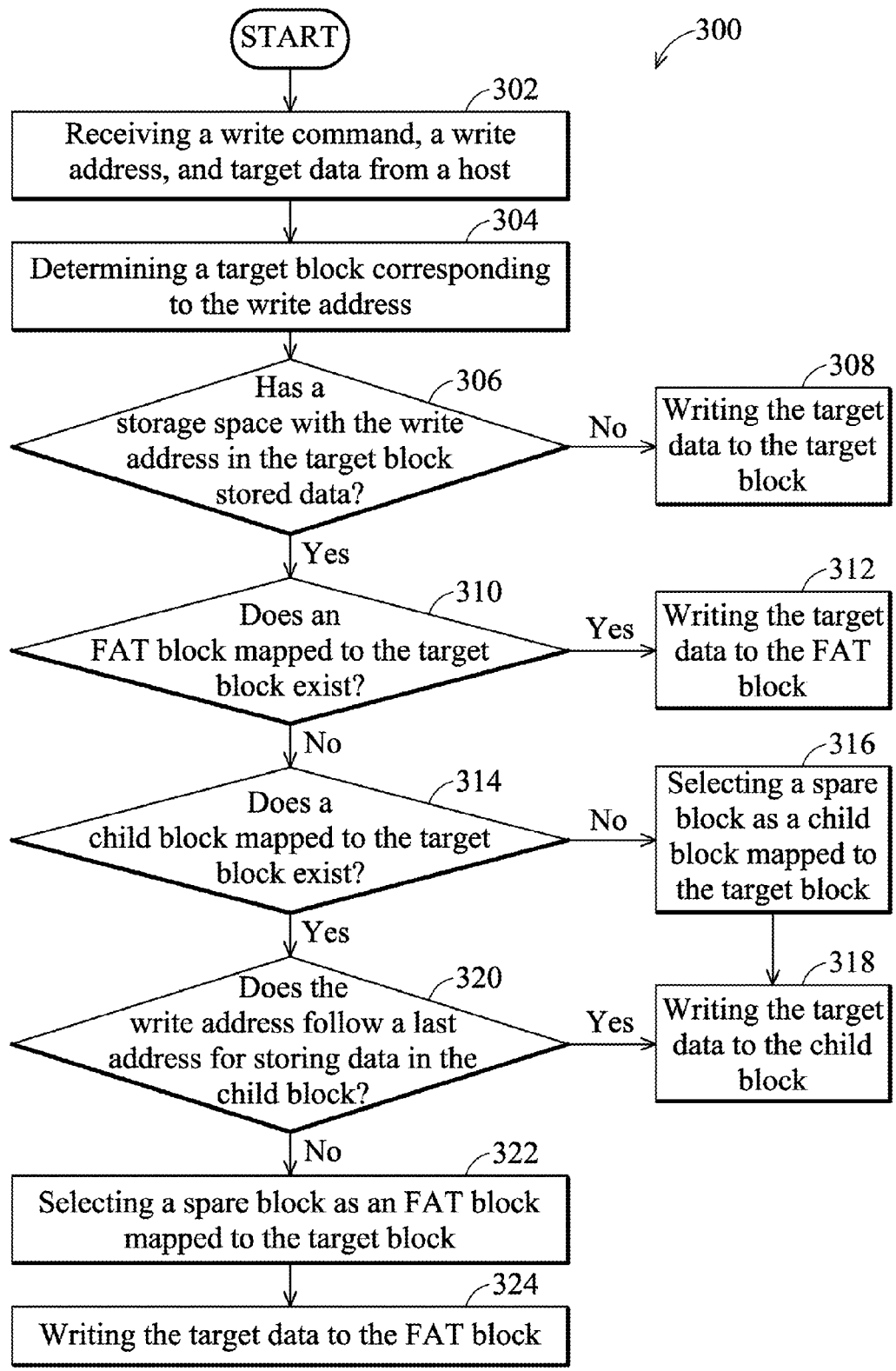
FIG. 3 is a flowchart of a method for writing data to a flash memory according to the invention.

Referring to FIG. 3, a flowchart of a method 300 for writing data to a flash memory 214 according to the invention is shown. The controller 212 executes write commands received from the host 202 according to the method 300. First, the controller 212 receives a write command, a write address, and target data from the host 202 (step 302). The controller 212 then determines a target block corresponding to the write address (step 304), wherein the target block is one of a plurality of blocks in the flash memory 214. The controller 212 then determines whether a storage space with the write address in the target block has stored data (step 306). When the storage space with the write address has not stored data, the controller 212 directly writes the target data received from the host 202 to the storage space of the target block according to the write address (step 308).

When the storage space with the write address in the target block has store data, the controller 212 cannot directly write the target data to the storage space of the target block. The controller 212 then determines whether an FAT block mapped to the target block exist in the flash memory 214 (step 310). When the FAT block mapped to the target block exists, the controller 212 writes the target data received from the host 202 to the FAT block (step 312), and then writes an update address table to the FAT block, wherein the update address table records a mapping relationship between an original address originally aimed to store the target data in the target block and an update address for storing the target data in the FAT block.

When there is not an FAT block mapped to the target block in the flash memory 214 (step 310), the controller 212 determines whether a child block mapped to the target block exist in the flash memory 214 (step 314). When there is not a child block mapped to the target block in the flash memory 214, the controller 212 selects a spare block from the flash memory 214 as a child block mapped to the target block (step 316), and then writes the target data received from the host 202 to the child block (step 318). When the child block mapped to the target block exists (step 314), the controller 212 determines whether the write address of the target data follows a last address for storing data in the child block (step 320). When the write address of the target data does not follow the last address according to which data has stored in the child block, the controller 212 selects a spare block from the flash memory 214 as an FAT block mapped to the target block (step 322), and writes the target data to the FAT block (step 324). When the write address of the target data follows the last address according to which data has stored in the child block (step 320), the controller 212 directly writes the target data to the child block (step 318).

Figure 4B:
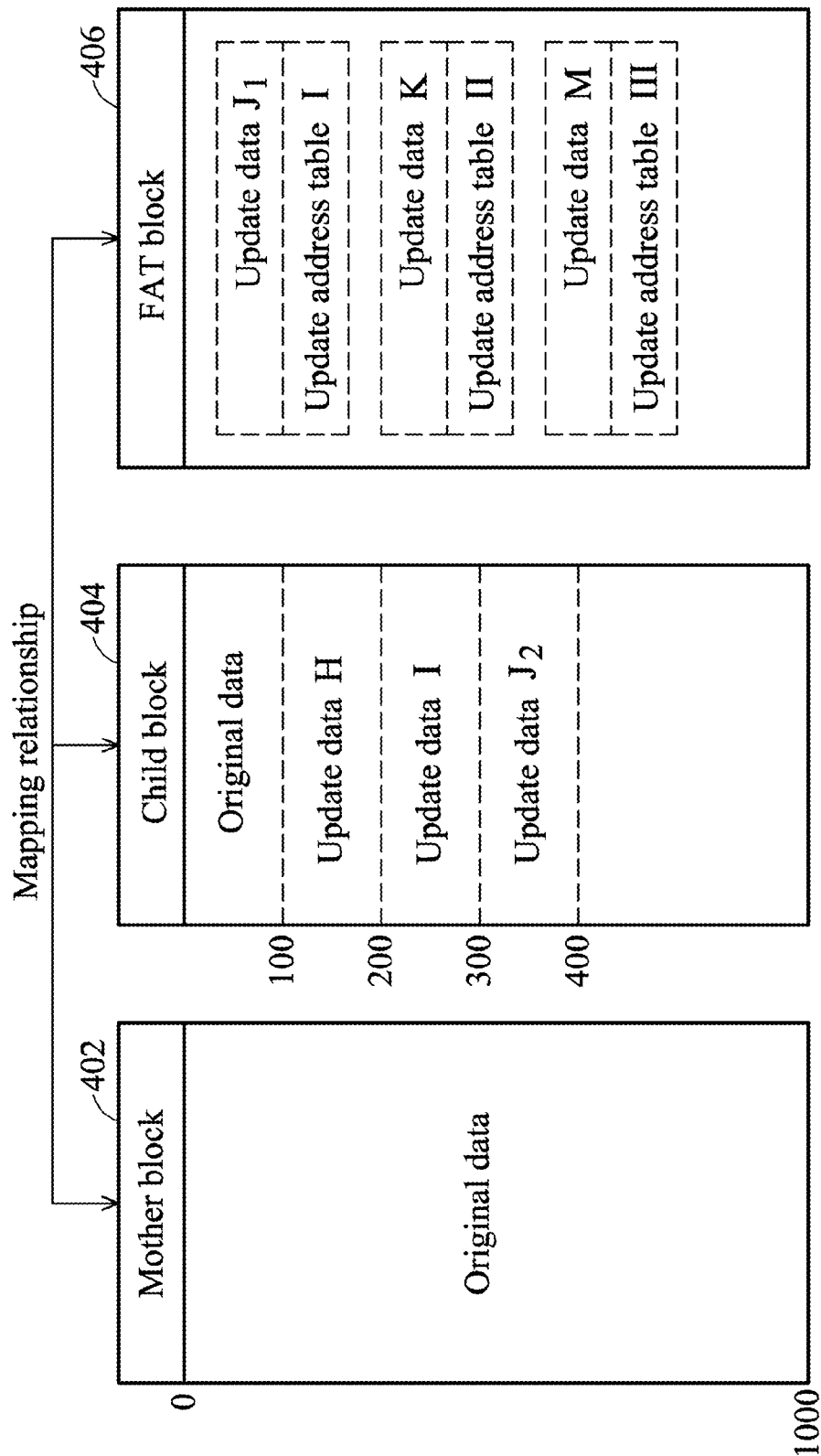
FIG. 4B shows a mother block accessed by the write commands of FIG. 4A and a child block and an FAT block mapped to the mother block.

The aforementioned data writing method 300 is further illustrated with FIGS. 4A and 4B. Referring to FIG. 4A, an embodiment of a series of write commands sent by the host 202 to the controller 212 is shown. Referring to FIG. 4B, a mother block accessed by the write commands of FIG. 4A and a child block and an FAT block mapped to the mother block are shown. Assume that the controller 212 first receives a write command 1 from the host 202, and the write command 1 requests the controller 212 to write update data H to an address range 101~200 of the flash memory 214. The mother block 402 has stored an original data with an address range from 0~1000, and the address range 101~200 of the update data H therefore corresponds to the mother block 402. Because the address range 101~200 of the mother block has stored data, the controller 212 therefore cannot directly write the update data H to the mother block 402.

When there is not a child block and an FAT block mapped to the mother block 402 in the flash memory 214, the controller 212 selects a spare block from the flash memory 214 as the child block 404 mapped to the mother block 402. The controller 212 then copies the original data with an address range 0~100 to the child block 404, and then writes the update data H to an address range 101~200 of the child block 404. The starting address 101 of the update data H therefore follows the last address 100 for storing the original data in the child block 404. The host 202 then sends a write command 2 to the controller 212 to request the controller 212 to write update data I to an address range 201~300 of the flash memory 214. Because the address range 201~300 of the mother block 402 has stored original data, and the address range 201~300 of the update data I follows a last address 200 for storing data in the child block 404, the controller 212 writes the update data I to an address range 301~300 of the child block 404.

The host 202 then sends a write command 3 to the controller 212 to request the controller 212 to write update data J to an address range 251~400 of the flash memory 214. The controller 212 divides the update data J into update data J1 with an address range 251~300 and update data J2 with an address range 301~400, wherein a starting address 301 of the update data J2 follows a last address 300 for storing data in the child block 404. Thus, the controller 212 writes the update data J2 to an address range 301~400 of the child block 404. Because the address range 251~300 of the child block 404 has stored data, the controller 212 cannot write the update data J1 to the child block 404. The controller 212 therefore selects a spare block from the flash memory 214 as an FAT block 406 mapped to the mother block 402, then writes the update data J1 to the FAT block 406, and then also writes an update address table I corresponding to the update data J1 to the FAT block 406.

The host 202 then sends a write command 4 to the controller 212 to request the controller 212 to write update data K to an address range 451~500 of the flash memory 214. Because the address range 451~500 of the mother block 402 has stored original data, the controller 212 directly writes the update data K to the FAT block 406, and then also writes an update address table II corresponding to the update data J1 and K to the FAT block 406. The host 202 then sends a write command 5 to the controller 212 to request the controller 212 to write update data M to an address range 401~500 of the flash memory 214. Because the FAT bloc 406 mapped to the mother block 402 exists in the flash memory 214, the controller 212 directly writes the update data M to the FAT block 406, and then also writes an update address table III corresponding to the update data M, J1, and K to the FAT block 406.

Referring to FIG. 5, an embodiment of an update address table 500 stored in an FAT block according to the invention is shown. The update address table 500 records a mapping relationship between original addresses originally aimed to store update data in a mother block and update addresses for physically storing the update data in the FAT block. In one embodiment, the update address table 500 comprises two corresponding columns comprising an original address column and an update data column. Assume that a mother block has an address range from 0 to 1000. The original address column of the update address table 500 therefore ranges from 0 to 1000. The update address column of the update address table 500 stores addresses of an FAT block for storing corresponding update data. For example, as shown in FIG. 5, there is no update addresses corresponding to original addresses 0~2 in the update address column of the update address table 500, indicating that the FAT block does not store update data corresponding to original addresses 0~2. In addition, there is update addresses 353 and 354 respectively corresponding to original addresses 998 and 999 in the update address column of the update address table 500, indicating that the FAT block respectively stores update data corresponding to original addresses 998 and 999 in pages with addresses 353 and 354. Thus, the controller 212 can determine an update address for storing update data in the FAT block according to the update address table 500.

Figure 6:
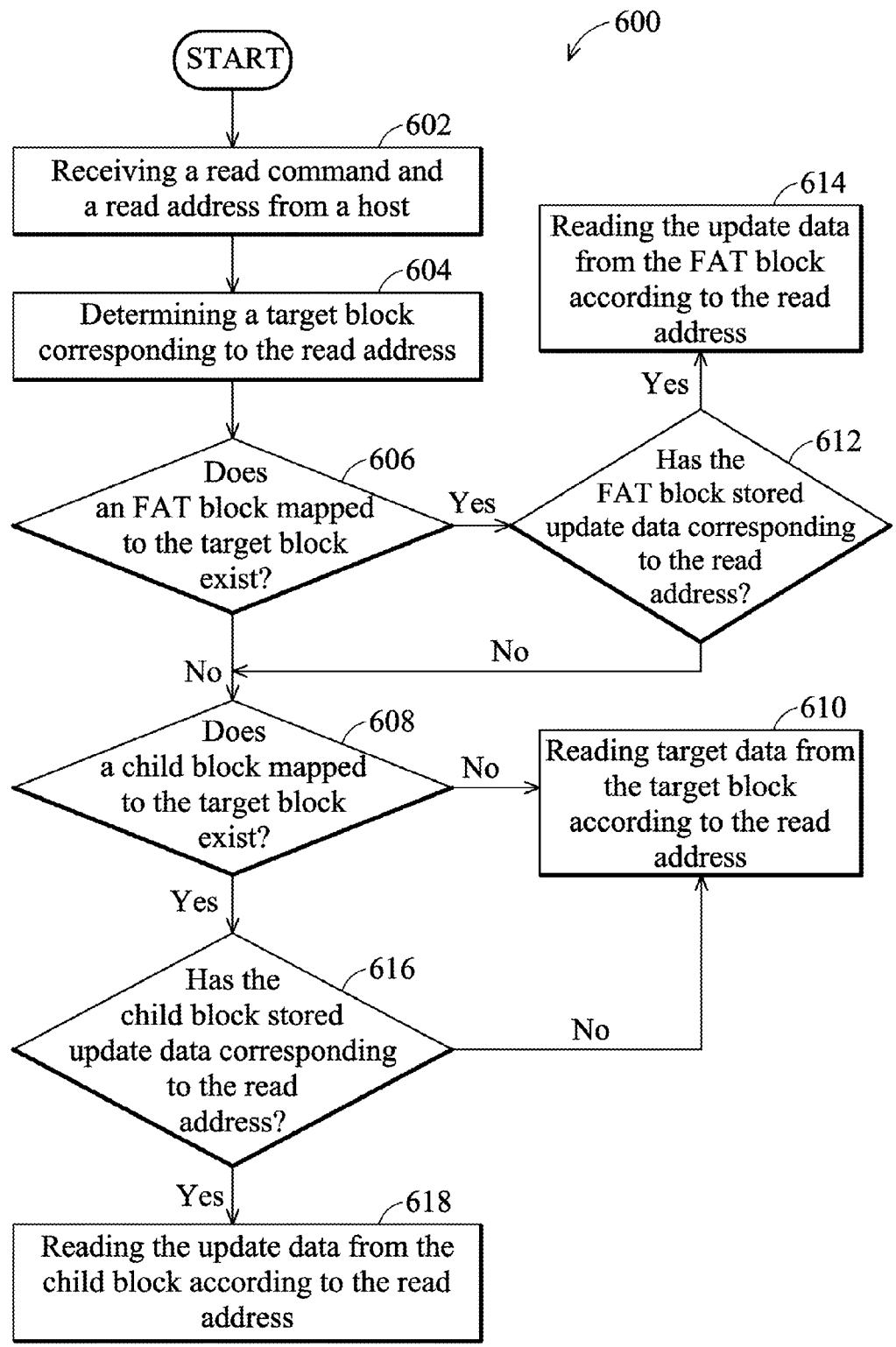
FIG. 6 is a flowchart of a method for reading data from a flash memory according to the invention.

Referring to FIG. 6, a flowchart of a method 600 for reading data from a flash memory 214 according to the invention is shown. The controller 212 executes read commands received from the host 202 according to the method 600. First, the controller 212 receives a read command and a read address from the host 202 (step 602). The controller 212 then determines a target block corresponding to the read address (step 604). The controller 212 then determines whether an FAT block mapped to the target block exist in the flash memory 214 (step 606). If the FAT block exists, the controller 212 further determines whether the FAT block has stored update data corresponding to the read address according to an update address table of the FAT block (step 612). When the FAT block has stored the update data corresponding to the read address, the controller 212 reads the update data from the FAT block according to the read address (step 614).

Otherwise, when the FAT block does not store the update data corresponding to the read address (step 612), or when the FAT block mapped to the target block does not exist in the flash memory 214 (step 606), the controller 212 further determines whether a child block mapped to the target block exist in the flash memory 214 (step 608). When the child block does not exist, the controller 212 directly reads target data from the target block according to the read address (step 610). When the child block exists (step 608), the controller 212 further determines whether the child block has stored update data corresponding to the read address (step 616). When the child block stores update data corresponding to the read address, the controller 212 reads the update data from the child block according to the read address (step 618). When the child block does not store update data corresponding to the read address (step 616), the controller 212 directly reads target data from the target block according to the read address (step 610).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A data access method for a flash memory, comprising:
receiving a write command, a write address, and target data from a host;
determining a target block corresponding to the write address, wherein the target block is one of a plurality of blocks of the flash memory;
determining whether a storage space with the write address in the target block has stored data;
when the storage space of the target block has not stored data, writing the target data to the storage space of the target block;
when the storage space of the target block has stored data, determining whether a file allocation table (FAT) block mapped to the target block exists in the flash memory;
when the FAT block exists, writing the target data to the FAT block;
when the FAT block does not exist, determining whether a child block mapped to the target block exists in the flash memory;

when the child block exists, determining whether the write address follows a last address according to which data has been stored in the child block; and when the write address follows the last address, writing the target data to the child block.

2. The data access method as claimed in claim 1, wherein the method further comprises:
when the child block does not exist, selecting a spare block from the flash memory as the child block mapped to the target block; and
writing the target data to the child block.

3. The data access method as claimed in claim 1, wherein the method further comprises:
when the write address does not follow the last address, selecting a spare block from the flash memory as the FAT block mapped to the target block; and
writing the target data to the FAT block.

4. The data access method as claimed in claim 1, wherein the step of writing the target data to the FAT block comprises:
determining a first storage space form the FAT block;
writing the target data to the first storage space;
determining a second storage space from the FAT block; and
writing an update address table to the second storage space;
wherein the update address table stores a mapping relationship between an original address originally aimed to store the target data in the target block and an update address for storing the target data in the FAT block.

5. The data access method as claimed in claim 1, wherein the step of writing the target data to the child block comprises:
determining a third storage space following the last address in the child block; and
writing the target data to the third storage space.

6. The data access method as claimed in claim 1, wherein the method further comprises:
receiving a read command and a read address from the host;
determining a target read block corresponding to the read address;
determining whether a read FAT block mapped to the target read block exists in the flash memory;
when the read FAT block exists, determining whether the read FAT block stores first update data according to the read address; and
when the read FAT block stores the first update data, reading the first update data from the read FAT block.

7. The data access method as claimed in claim 6, wherein the method further comprises:
when the read FAT block does not exist, or when the read FAT block does not store the first update data, determining whether a read child block mapped to the target read block exists in the flash memory; and
when the read child block does not exist, reading second update data from the target read block according to the read address.

8. The data access method as claimed in claim 7, wherein the method further comprises:
when the read child block exists, determining whether the read child block stores third update data according to the read address;
when the read child block stores the third update data, reading the third update data from the read child block according to the read address; and
when the read child block does not store the third update data, reading the second update data from the target read block according to the read address.

9. A data storage device, comprising:
a flash memory, comprising a plurality of blocks for data storage; and
a controller, receiving a write command, a write address, and target data from a host, determining a target block corresponding to the write address, determining whether a storage space with the write address in the target block has stored data, writing the target data to the storage space of the target block when the storage space of the target block has not stored data, determining whether a file allocation table (FAT) block mapped to the target block exists in the flash memory when the storage space of the target block has stored data, writing the target data to the FAT block when the FAT block exists, determining whether a child block mapped to the target block exists in the flash memory when the FAT block does not exist, determining whether the write address follows a last address according to which data has been stored in the child block when the child block exists, and writing the target data to the child block when the write address follows the last address.

10. The data storage device as claimed in claim 9, wherein when the child block does not exist, the controller selects a spare block from the flash memory as the child block mapped to the target block, and writes the target data to the child block.

11. The data storage device as claimed in claim 9, wherein when the write address does not follow the last address, the controller selects a spare block from the flash memory as the FAT block mapped to the target block, and writes the target data to the FAT block.

12. The data storage device as claimed in claim 9, wherein when the controller writes the target data to the FAT block, the controller determines a first storage space form the FAT block, writes the target data to the first storage space, determines a second storage space from the FAT block, and writes an update address table to the second storage space, wherein the update address table stores a mapping relationship between an original address originally aimed to store the target data in the target block and an update address for storing the target data in the FAT block.

13. The data storage device as claimed in claim 9, wherein when the controller writes the target data to the child block, the controller determines a third storage space following the last address in the child block, and writes the target data to the third storage space.

14. The data storage device as claimed in claim 9, wherein the controller receives a read command and a read address from the host, determines a target read block corresponding to the read address, determines whether a read FAT block mapped to the target read block exists in the flash memory, determines whether the read FAT block stores first update data according to the read address when the read FAT block exists, and reads the first update data from the read FAT block when the read FAT block stores the first update data.

15. The data storage device as claimed in claim 14, wherein the controller determines whether a read child block mapped to the target read block exists in the flash memory when the read FAT block does not exist or when the read FAT block does not store the first update data, and the controller reads second update data from the target read block according to the read address when the read child block does not exist.

16. The data storage device as claimed in claim 14, wherein the controller determines whether the read child block stores third update data according to the read address when the read child block exists, reads the third update data from the read child block according to the read address when the read child block stores the third update data, and reads the second update data from the target read block according to the read address when the read child block does not store the third update data.

* * * * *